United States Patent
Epstein et al.

(10) Patent No.: US 6,210,171 B1
(45) Date of Patent: Apr. 3, 2001

(54) METHOD AND APPARATUS FOR MULTIPLE CHOICE TESTING SYSTEM WITH IMMEDIATE FEEDBACK FOR CORRECTNESS OF RESPONSE

(76) Inventors: Michael L. Epstein; Beth B. Epstein, both of 5 Registry Dr., Lawrenceville, NJ (US) 08648

( * ) Notice: Subject to any disclaimer, the term of this patent is extended or adjusted under 35 U.S.C. 154(b) by 0 days.

(21) Appl. No.: 08/985,322

(22) Filed: Dec. 4, 1997

(51) Int. Cl.[7] .................................................. G09B 3/00
(52) U.S. Cl. ......................... 434/346; 434/358; 434/348
(58) Field of Search .................................. 434/327, 346, 434/348, 358

(56) References Cited

U.S. PATENT DOCUMENTS

| | | | |
|---|---|---|---|
| 2,764,821 | 10/1956 | Buitenkant | 35/9 |
| 2,961,777 | 11/1960 | Neville et al. | 35/9 |
| 2,986,820 | 6/1961 | Neville et al. | 35/9 |
| 3,055,117 | 9/1962 | Bernstein et al. | 36/9 |
| 3,055,820 | 9/1962 | Bernstein et al. | 35/9 |
| 3,264,760 * | 8/1966 | St. Clair | 464/346 |
| 3,283,416 * | 11/1966 | Taylor et al. | 434/346 |
| 3,499,235 * | 3/1970 | Cornell, III et al. | 434/346 |
| 3,503,142 * | 3/1970 | Wolowicz et al. | 434/346 |
| 3,800,439 * | 4/1974 | Sokolski et al. | 434/358 |
| 3,918,174 * | 11/1975 | Miller et al. | 434/346 |
| 3,938,993 | 2/1976 | Royka et al. | 96/1.4 |
| 3,983,364 * | 9/1976 | Firehammer et al. | 434/358 |
| 4,337,051 | 6/1982 | Donlon | 434/328 |
| 4,508,513 * | 4/1985 | Donovan | 434/346 |
| 4,964,642 * | 10/1990 | Kamille | 434/346 |
| 5,085,587 * | 2/1992 | DesForges et al. | 434/358 |
| 5,123,658 * | 6/1992 | Elfanbaum | 434/346 |
| 5,542,710 | 8/1996 | Silverschotz et al. | 283/91 |
| 5,562,284 | 10/1996 | Stevens | 273/139 |

* cited by examiner

*Primary Examiner*—Jessica J. Harrison
(74) *Attorney, Agent, or Firm*—Kenneth Watov; Watov & Kipnes, P.C.

(57) ABSTRACT

An answer form for use in answering multiple-choice questions is configured to provide immediate feedback to an examinee as to whether a correct response has been made for each question, and if not, permits the examinee to proceed to determine the correct response. The multiple-choice test answer form provides for recording fill or partial credit for any response on the answer form, and is capable of being scored either manually or automatically by apparatus for form scoring. The answer form includes a substrate such as a paper surface upon which is printed a varying number of rows and columns of answer alternatives. The rows correspond to the questions to be answered, and the columns correspond to the number of answer alternatives for each question. Each alternative is covered by an opaque coating that can be rubbed off to reveal whether a particular alternative conceals an indication that the alternative is correct or not. A blank space beneath the opaque coating indicates an incorrect alternative.

10 Claims, 6 Drawing Sheets

METHOD AND APPARATUS FOR MULTIPLE CHOICE TESTING SYSTEM WITH IMMEDIATE FEEDBACK FOR CORRECTNESS OF RESPONSE

FIELD OF THE INVENTION

The present invention relates generally to educational testing systems, and more particularly to a multiple choice testing system and method providing immediate feedback as to the correctness of an answer choice, thereby facilitating learning and improving retention.

BACKGROUND OF THE INVENTION

Research has shown that feedback in the form of knowledge of test results is highly beneficial for learning, with the maximum benefit accruing when the time delay between the production of the results and the feedback is minimal. Still, many examiners administer multiple-choice examinations with answer forms on which examinees typically darken one space (labeled A, B, C or D) in a row of spaces for each of a number of questions to indicate their preferred responses to the questions. This typical answer form is unable to inform the examinee whether or not a response was correct or incorrect at the time the response is made. At a later time, examinees' answer forms may be returned with indices noting the correct responses. However, unless examinees have perfect recall of the test questions, and the order in which they appeared on the examination, the typical answer forms do not provide examinees with knowledge of the particular questions they responded to correctly and those that they did not.

Learning results in a relatively permanent change in behavior or mental associations as a function of experience with feedback. Research has shown that delaying informative feedback about the correctness of one's responses for as little as 12 seconds in a problem-solving task may significantly reduce the ease of learning and also decrease overall retention. It is clear that an answer form that would provide immediate informative feedback for the correctness of an examinees' responses would facilitate learning and improve retention.

An optimal examination procedure would be one that would include an answer form that would assess what the examinee knows as well as immediately provide feedback about incorrect responses while teaching the correct ones. Such an answer form would be a more efficient use of time and a significant improvement over the current methodology. The immediate feedback answer form would teach new knowledge at the same time it assesses current knowledge. Currently used multiple-choice forms do not provide corrective feedback to the examinee at the time of responding. Therefore, an opportunity to teach the correct response to a problem is lost. In addition, if later questions on an examination relate to information from earlier questions, an examinee who incorrectly answers a question on the current answer forms, where there is no corrective feedback, is more likely to miss the later ones. That is, an examinee's responses on a typical multiple-choice answer form may misgauge his level of understanding and his ability to profit from timely instruction.

An advantage of current multiple-choice answer forms is their ability to be scored automatically by a scanning device that is sensitive to the darkened option in a row of options for each question, for example. The "correct" option is the space on the answer form (labeled A, B, C or D, etc.) that corresponds to a similarly labeled answer option on the test form. If an incorrect answer option is darkened on the answer form, or if more than one space in a given row of options is darkened, the scanning machine automatically records the examinee's response as incorrect for that particular question. The total number of correctly marked answer options is typically recorded by the scoring machine and printed on the test form. The ease of assessing test results of large numbers of examinees has made the use of scannable, multiple-choice answer forms extremely popular.

For the foregoing reasons, there is a need for a test-scoring method and apparatus that can be applied to multiple choice tests, that provides immediate feedback as to the correctness of each answer choice to the examinee, and that provides means for calculating and scoring partial credit based on the number of incorrect choices the examinee made before choosing the correct answer.

SUMMARY OF THE INVENTION

An object of this invention is to provide a test answer form for multiple-choice examinations that can be administered to a large number of examinees to assess their knowledge of examination questions while at the same time teaching them the answers to the questions that they initially answered incorrectly.

Another object of the invention is to provide an immediate feedback multiple-choice examination form designed to confirm to an examinee his/her correct responses and incorrect responses.

Another object of the invention is to enable a test examiner to allocate partial credit for a correct response to a question that was made subsequent to a previous incorrect response or responses to that question on a multiple-choice answer form for one embodiment of the invention.

Another object of the invention is to maximize multiple-choice examination security.

A further object of the invention is to provide a feedback form useful for scoring games and contests, providing entertainment, and providing programmed learning via an immediate feedback scoring system with a partial credit option.

In one embodiment of the invention, with the problems of the prior art in mind, various of the objects of the invention are provided by a unique answer form having a varying number of rows and columns, depending upon the particular application. The numbered rows corresponding to the number of questions on the examination, and the columns corresponding to the answer options (A, B, C, D etc.) to each of the test questions. Each answer option of the test form is covered with an opaque covering capable of being rubbed off by the examinee. The correct response to a question is immediately discernible by an exposed indicator under one of the response options in a row of options, while an incorrect response is indicated by a blank space in that row. Consequently, the form indicates to the examinee immediately whether his response is correct or incorrect. If incorrect, the examinee selects a second preferred alternative and rubs or lifts the coating off of that choice on the answer form. The examinee continues in a like manner until a correct response is indicated. The examiner can determine if the examinee responded correctly on the first, second or later attempts by the number of answer spaces exposed.

In another embodiment of the invention, the security related objects of the invention are met by creating more than one version of the answer form, each with a different predetermined pattern of indicators for marking correct answers in the answer spaces under the opaque covering.

BRIEF DESCRIPTION OF THE DRAWINGS

The various embodiments of the invention are described in detail below with reference to the drawings, in which like items are identified by the same reference designation, wherein;

FIG. 2 is a view of an answer feedback form as in FIG. 1, as it would appear prior to the application of the opaque material covering each answer choice;

FIG. 3 is a view of an answer feedback form as it would appear prior to the application of the opaque material covering each answer choice, having an answer pattern different from that shown in FIG. 2;

FIG. 4 is a view of the embodiment of the answer feedback form of FIG. 3 as it would appear during an examination, with an example of the opaque material covering choices 1 through 12 as removed by the examinee;

FIG. 5 shows a view of the embodiment of the answer form of FIG. 3 as it would appear after a 10-question examination, with an example of portions of the opaque material covering each answer choice removed, and with typical full and partial scoring corresponding to various answer patterns assigned to each answer.

DETAILED DESCRIPTION OF THE INVENTION

Figure 1:
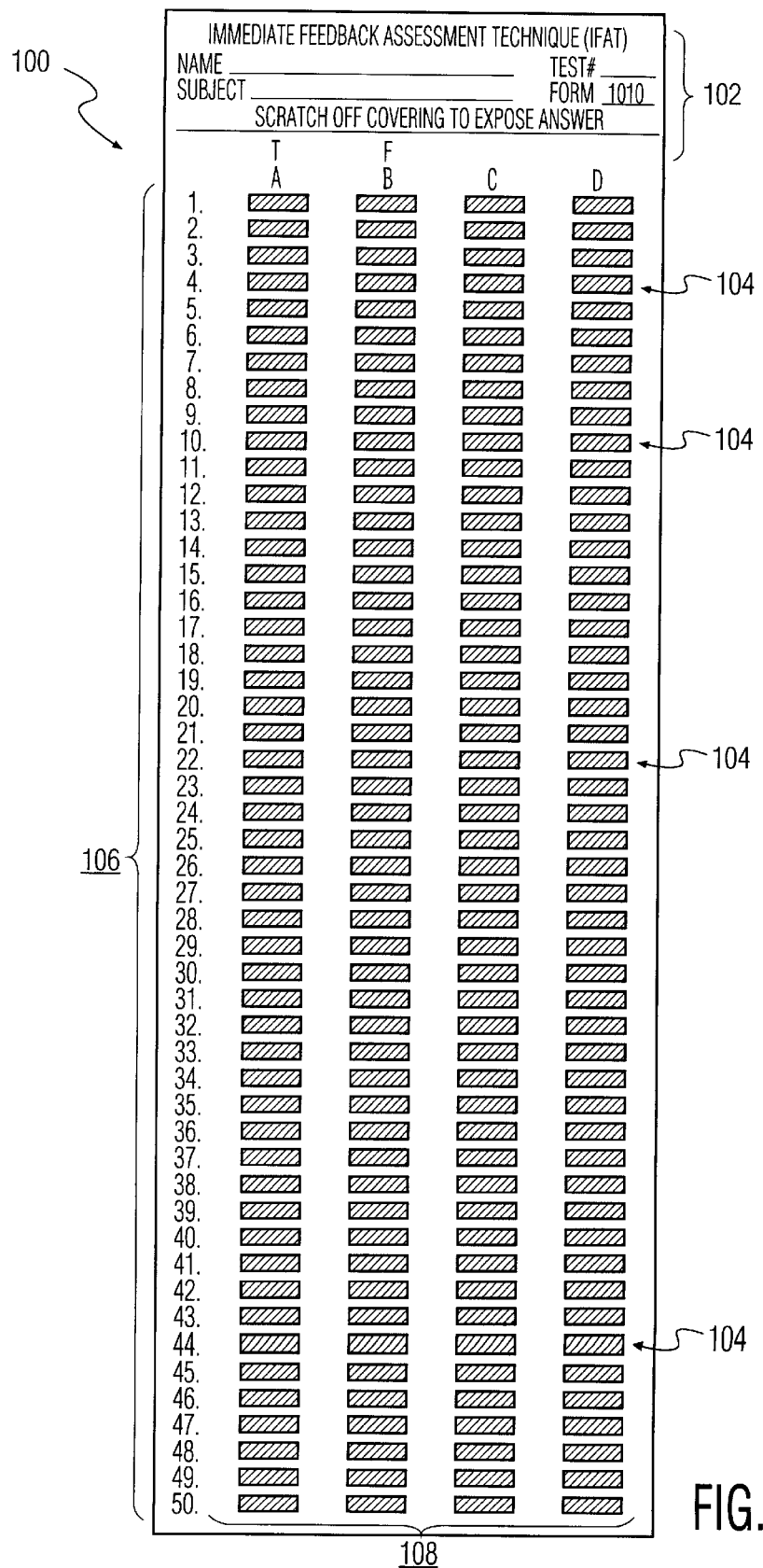
FIG. 1 is a view of one embodiment of an answer feedback form as it would appear to the examinee prior to starting a test.

A preferred embodiment of an answer form 100 having a test answer selection matrix printed thereon is shown in FIG. 1. The form has a heading 102 with appropriate spaces to record the name of the examinee, the subject, the test number and other relative identification information. The answer form has an array of answer locations 104, consisting of X rows 106, and Y columns 108 of geometric-shaped answer spaces that provides y response options for each X questions of a multiple-choice type examination. The Y response options in each of the X rows are covered by an opaque coating that is capable of being rubbed or lifted off to reveal the space beneath. The form example of FIG. 1 has 50 numbered rows to accommodate an examination having up to 50 multiple-choice questions and four columns labeled A, B, C, and D to accommodate up to four answer options. At least one column location contains a correct choice. Columns A and B are also labeled T and F to accommodate true and false questions.

Figure 2:
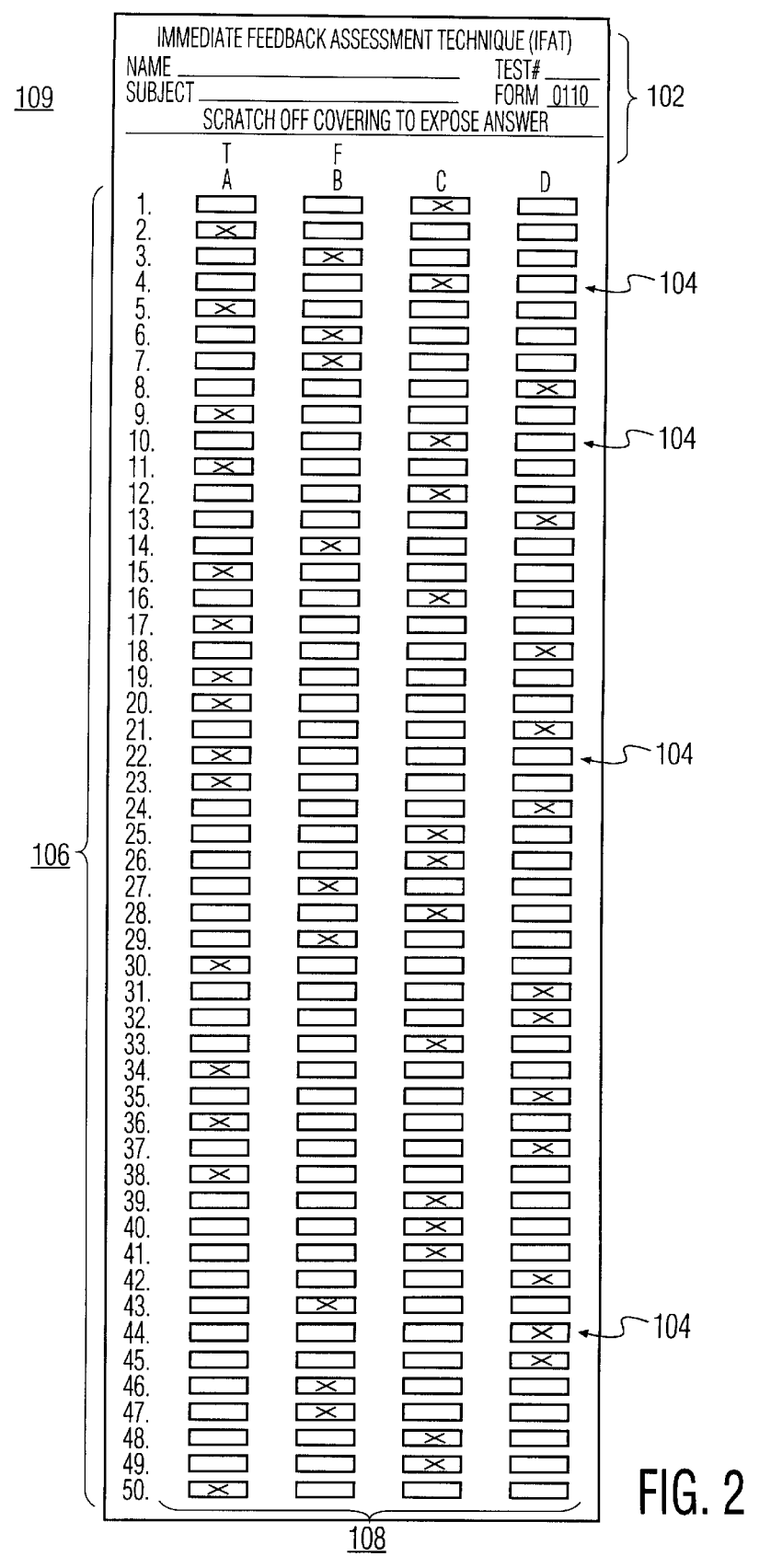

In FIG. 2 an example of a typical answer form embodiment 109 with all the answer options exposed is shown. Only one response in a row of possible answer options is correct, and that response option is indicated by a predetermined printed mark, or indicia, in the answer space beneath the opaque covering. As shown, in row 12 an X indicates the correct choice in the C that row. Other indicators or indicia than an X can be used to illustrate correct or incorrect indications.

Figure 3:
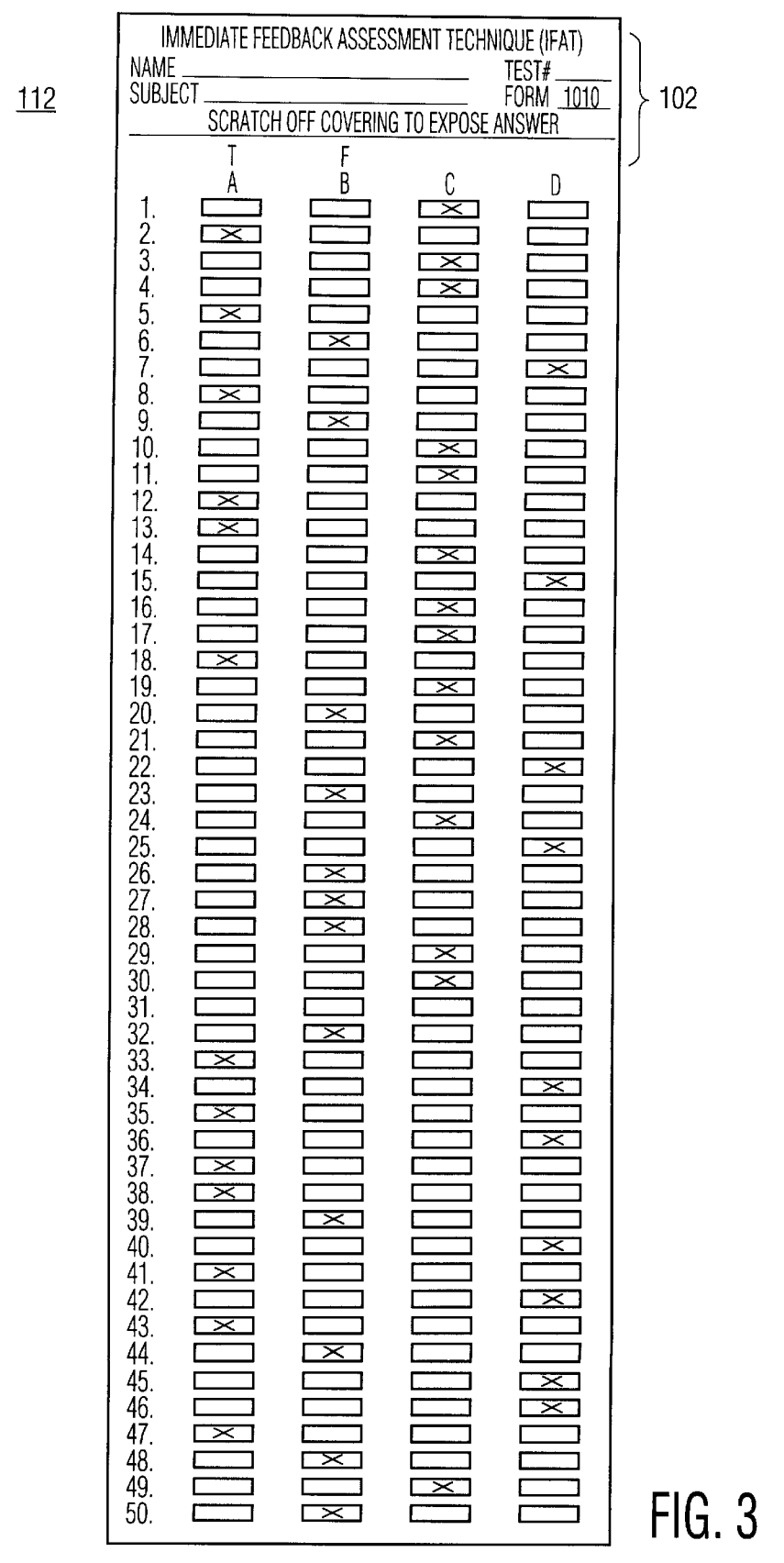

In FIG. 3 an example of an alternative embodiment is shown for an answer form 112, having an answer pattern different from FIG. 2, as it would appear prior to the opaque material covering each answer choice. The correct answer in row 12 of form 112 is found in column A rather than in column C as in form 109 of FIG. 2.

Figure 4:
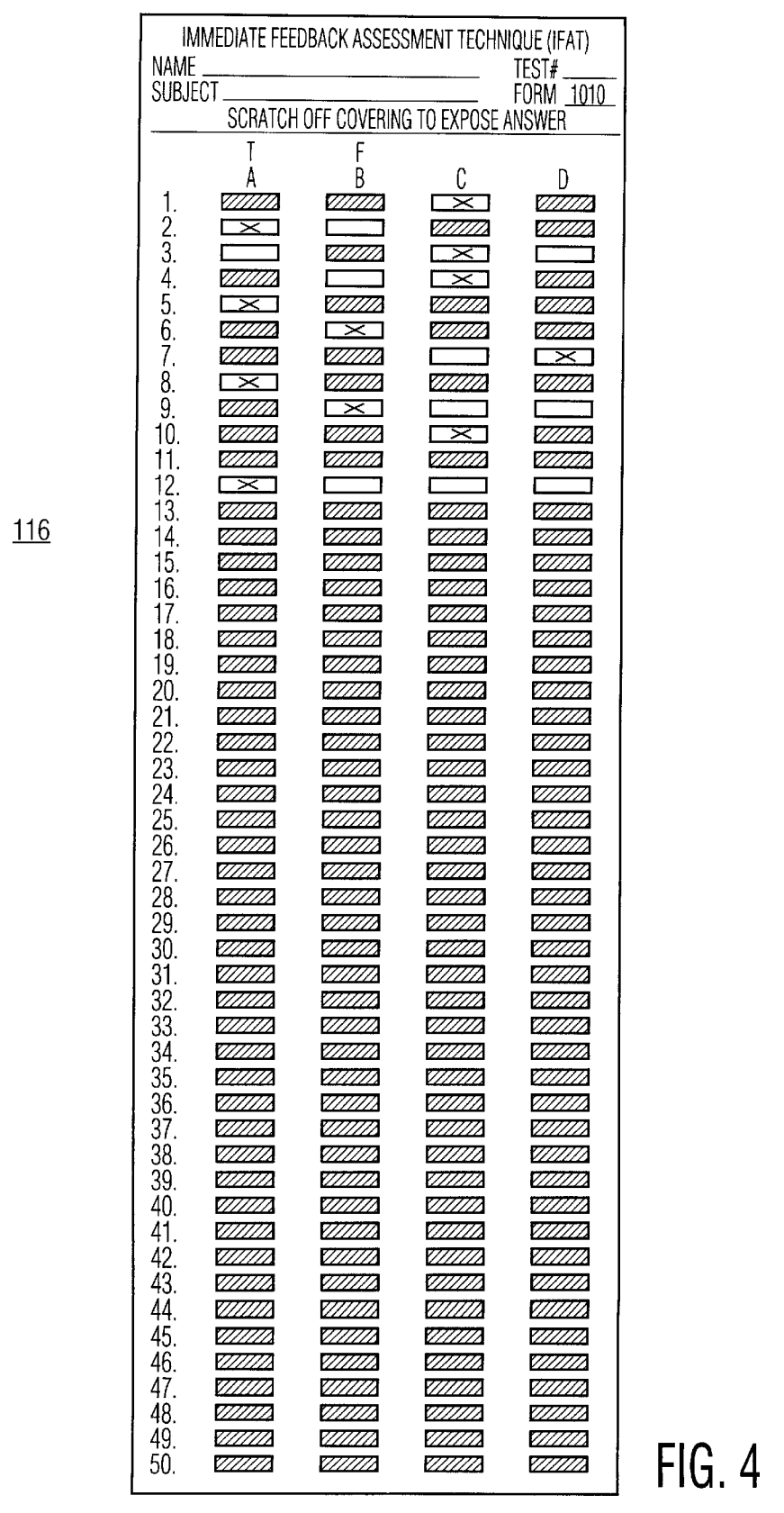

FIG. 4 shows an embodiment of a completed answer form 116. In particular, with respect to form 116, row 1 illustrates an answer uncovered in column C to a question wherein the examinee obtained the correct answer on the first attempted response, because it is the only response that is rubbed off. The examinee's response in row 4 reveals two rubbed off response options in columns B and C, indicating that the examinee required two responses to bare the correct alternative in column C for that examination question. The examinee's response in row 9 indicates the examinee required three choices to reach the correct answer in column B. In row 12 the correct response was not made until the examinee's fourth attempt in column A.

Figure 5:
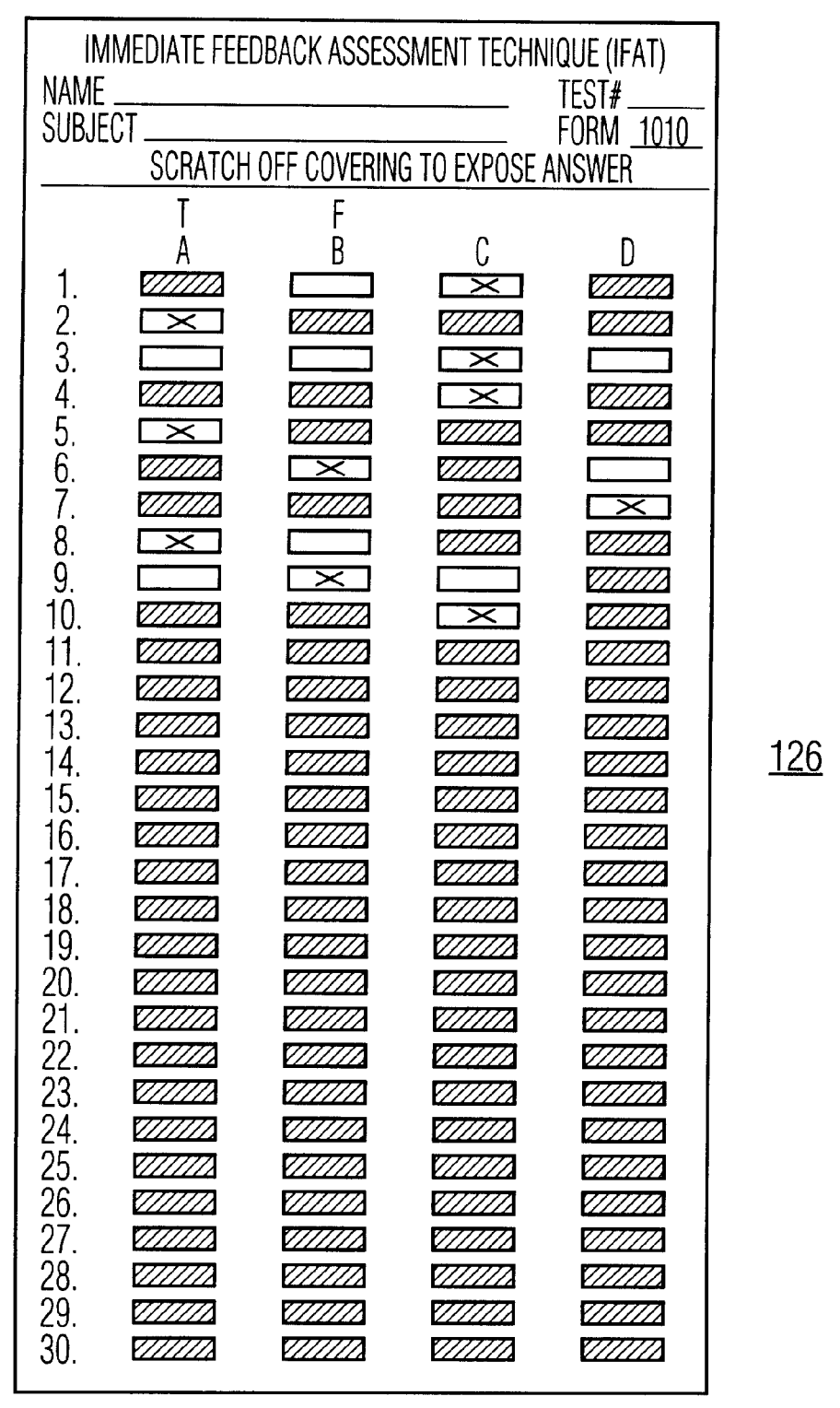

FIG. 5 shows an embodiment of completed rows 1 through 10 of a 30-row answer form 126 with fall, partial and no credit for different examinee response possibilities. A correct response in row 2 is revealed in column A, with a score of "2" for full credit in this example. The correct response option in row "6" required two responses by the examinee before it was revealed in column B, with a partial credit score of "1" being granted. The correct answer in column B in row 9 required three responses by the examinee before it was revealed, yielding a partial credit score of "½," for example. The correct total response option accrued by the examinee would be 13.5 for the ten questions answered using the scoring method described in this embodiment. Other scoring procedures with differing amounts of partial credit are possible, and this example is not meant to be limiting.

Figure 6:
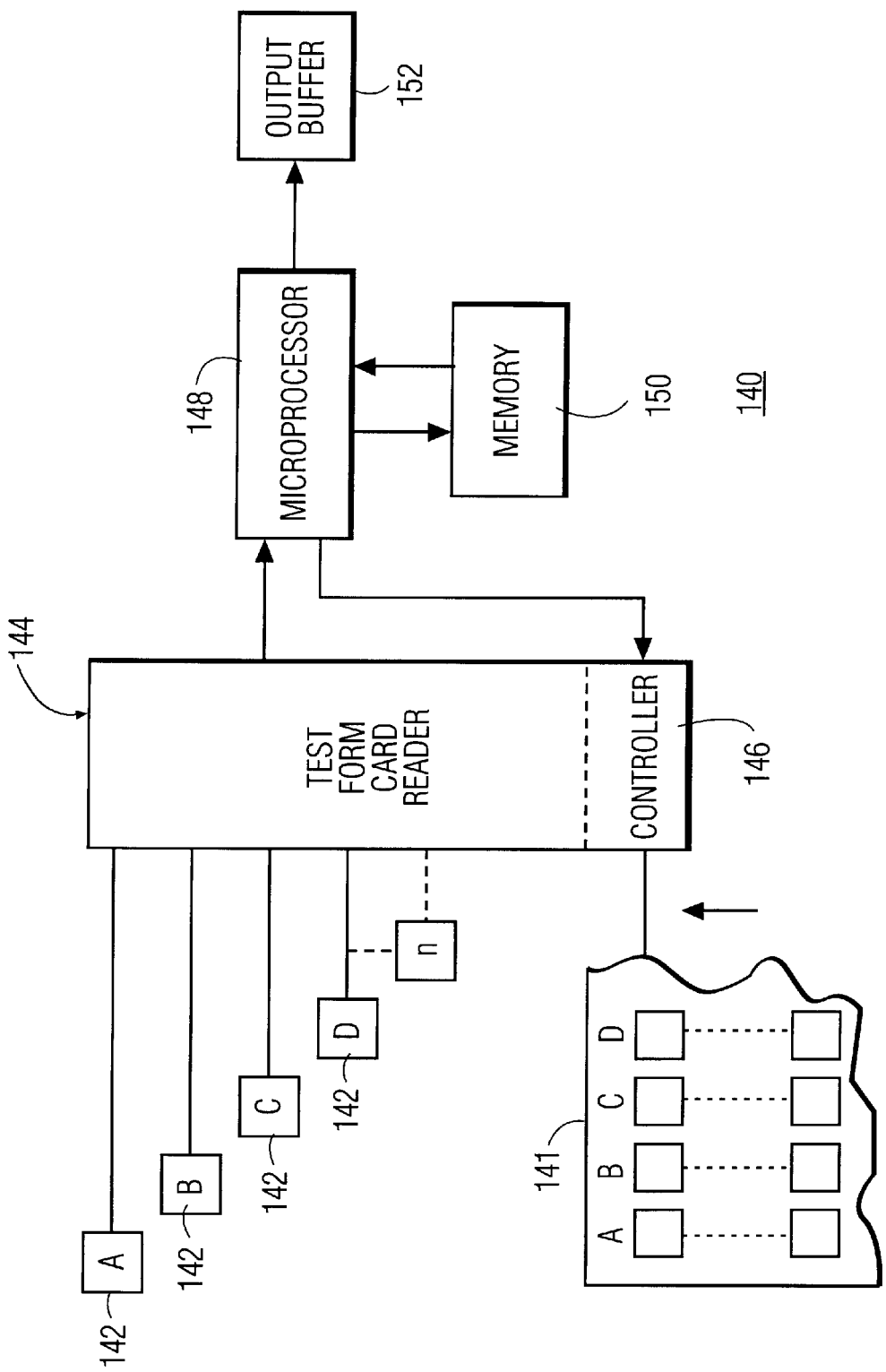
FIG. 6 shows for another embodiment of the invention a simplified block diagram of apparatus for automatically scoring answer feedback forms of various embodiments of the invention.

FIG. 6 shows an embodiment of a simplified block diagram of automated scoring apparatus that can be used to score an answer form 141 of the type shown in FIGS. 1 through 5. The apparatus 140 for scoring multiple-choice answer forms comprises a plurality of detectors 142 of a card reader 144 for reading each answer location to determine if the opaque cover has been removed. The number of detectors 142 is equal to the number of form columns Y. The card reader 144 includes a controller 146 responsive to control signals for moving an answer form 141 across detectors 142. A microprocessor 148 is programmed to receive answer choice signals and compare the answer choices for each question with the correct choices. The microprocessor 148 also is programmed to provide control signals to controller 146 for advancing the answer form row-by-row, as each row is read by the detectors 142 and processed by microprocessor 148. As each row is read, the microprocessor 148 calculates the score for each answer, giving full credit for a correct choice and less than full credit for answers containing incorrect choices. The microprocessor 148 is also selectively programmable to read various answer format configurations for various answer formats for different embodiments of the invention. The microprocessor 148 is programmed to calculate a total score for all of the test questions on an answer form 141, and can also be programmed to perform other calculations as required by the examination administrators. Optionally, the answers and the total score can be stored in a memory 150 for future use. Finally, the answers and the score can be made available at an output port 152 for external access for such purposes as recording or displaying examination results.

In each of the forms of various embodiments of the invention, the prospective answer selection options or locations 104 are printed onto a suitable substrate material of paper or cardboard, for example. Each possible answer choice element 104 has an erasable opaque covering in one embodiment of the invention. The examinee erases or removes the covering from a selected element 104 to record his or her answer to the corresponding question. One type of covering is the familiar instant rub off coverings. Alternatively, a chemical coating may be used to obscure the answer choices, which can be made transparent by the examinee during the test with a pen or stylus which renders the chemical coating transparent. Another alternative is to use peel-off material. One typical machine-readable covering is an electrically conductive film, in which the examinee's choice is detected by a change in the conductivity. Other techniques are to detect the change in opacity by measuring the transmission of light through the answer selection options, or the reflection of light from the surface of reflective answer selection options. Pattern recognition techniques using appropriate electro-optical systems and software may also be used.

A typical set of instructions to an examinee for using an answer form embodiment of the invention are:

1) Upon reading an examination question, select which response alternative (A, B, C, or D) you determine best answers the question.

2) Consider each response alternative carefully; partial credit may be given for correct responses on the second or later attempts.

3) Identify the geometric answer space (A, B, C, or D) on the answer form that is appropriate for that alternative.

4) Carefully rub off the opaque covering to completely reveal the space beneath that alternative.

5) If an "X" marker is exposed in the answer location, your response is correct.

6) However, if the area exposed in the answer location is blank, your response is incorrect, and you must then proceed as follows:

a) Consider the question and remaining response alternatives again and select the best response from the remaining alternatives.

b) Identify the appropriate geometric answer space for that alternative and rub off its covering.

c) Continue in this manner until you have exposed the correct alternative indicated by the "X" marker beneath the opaque covering.

Test security is a major concern in multiple-choice tests. Unauthorized access to the answer key can compromise the validity of many tests. One method for obtaining the answer key in a test of the kind where the correct answers are encoded would be to erase all of the choice coverings, thereby revealing the correct ones. One method to increase test security is to design a series of examinations in which more than one version of the answer form would be created, each with a different predetermined pattern of correct indicators under the opaque coverings. The number of different patterns of predetermined correct indicators, with one predetermined indicator in each row of spaces is a function of the number of rows, which are directly related to the number of questions in the test, and the number of columns, which are directly related to the number of alternatives for each question. For example, an answer form for a 50-question test, where the examinee responds to one of four possible answer options (A, B, C, or D) could be prearranged in $4^{50}$ different patterns; that is, more than $1 \times 10 \ 10^{30}$ possible different answer keys. An answer form for a 10-question examination with four response options per question would allow for $4^{10}$ different forms, which is more than one million different arrangements. In general, for an answer form with X question rows and Y answer columns, there are $X^y$ unique answer forms for a given examination. The rows X and columns Y can be varied either manually for tests having a small number of questions and answers, or by a programmed computer for larger examinations. Alternatively, test answer forms with prearranged patterns can be made, and identified by an appropriate number, or other designation. The tests can then be prepared with the answers to the questions keyed appropriately, thereby reducing the need to manufacture new forms for each test. A limited number of test forms, with the questions correspondingly arranged, can be used for any one test, thereby maintaining test security while minimizing the testing complexity. These would provide different sets of the test forms for a given test.

Although various embodiments of the invention have been shown and described, they are not meant to be limiting. Those of skill in the art may recognize various modifications to these embodiments, which modifications are meant to be covered by the spirit and scope of the appended claims.

What is claimed is:

1. A system for testing and providing test security including a self instruction feedback test answer form for multiple-choice questions, comprising:

a substrate;

a plurality of geometric shaped answer spaces printed on said substrate and arranged in X rows and Y columns, with each row being associated with a particular question, and each column with a possible answer choice;

at least a selected one of the answer spaces in each row being imprinted with indicia indicative of a correct answer;

a removable opaque material covering each of said answer spaces, wherein an examinee is instructed for each question to remove said opaque material from a first best choice answer space, and proceeding if not correct to a second best choice, and if not correct continuing to uncover answer spaces until a correct answer is indicated, for immediate feedback to the examinee of the correct answer to the question;

scoring apparatus for automatically scanning said answer spaces to score a completed test answer form based upon the number of answer spaces uncovered for each question on a weighted basis; and a plurality of sets of a limited number of said test forms being provided for any one test, whereby each set of forms differs from any other of said plurality of sets of test forms in the arrangement of the X rows and Y columns for like questions and respective answers.

2. The system of claim 1, wherein said apparatus includes:

means for calculating a score for each question requiring an answer, said calculating means being programmable for giving fall credit for a correct choice where only one answer space has opaque material removed in a given row and that space represents a correct answer, and less than full credit for a row in which the opaque material has been removed from more than one answer space, inclusive of the correct answer space.

3. The system of claim 1, wherein said removable opaque material covering of said test answer form is erasable.

4. The system of claim 1, wherein the opaque material covering of said test answer form is machine-readable.

5. The system of claim 1, further including for a given test a plurality of different formats for a plurality of said answer forms for the same test questions, respectively, obtainable by varying the selected row positions imprinted with indicia for indicating correct answers via repositioning of possible answers for different questions on a related sheet of questions, respectively, for the same test questions.

6. The system of claim 1, wherein said test answer form includes a heading for recording desired information.

7. The system of claim 1, wherein said scoring apparatus includes:

a card reader including:
- a plurality of detector means for reading answer choices at each answer location in each row of a test answer form, and providing answer choice signals indicative of answer choices made for a given question on a test answer form;
- control means responsive to control signals for advancing said test answer form row-by-row past said detector means;
- microprocessor means programmed for both providing said control signals to said control means, and for receiving said answer choice signals for calculating the score for each question and the total test score; and
- output port means for outputting examination score data from said microprocessor.

8. The system of claim 7, wherein said scoring apparatus further includes memory means for storing the answers and the total score for a plurality of successively scored test answer forms.

9. The system of claim 7, wherein said microprocessor means is programmed to perform partial credit scoring.

10. A method for administering a secure multiple-choice examination to an examinee using a test system including a substrate; a plurality of geometric shaped answer spaces printed on said substrate and arranged in X rows and Y columns, with each row being associated with a particular question, and each column with a possible answer choice; at least one of the answer spaces in each row being imprinted with indicia indicative of a correct answer; a removable opaque material covering each of said answer spaces; wherein said method comprises the steps of providing security for any one test by having multiple sets each of a limited number of test forms, with the forms of each set having the rows X and columns Y varied relative to any other set for the included questions and respective answers of the test; and instructing the examinee to perform the steps of:
  selecting which of a plurality of response alternatives (A, B, C, D. . .) best answers the question;

identifying the row on the answer form representing the question, and the geometric space (A, B, C, D. . .) in that row on the answer form that is appropriate for that alternative;

removing the opaque covering from the selected geometric space to completely reveal the space beneath the opaque covering;

determining if said indicia is exposed indicating the select response is correct; and if the uncovered area of the selected response is blank,
  a) reconsidering the question and remaining response alternatives again and selecting the best response from the remaining;
  b) identifying the appropriate geometric space for that alternative and rubbing off its covering; and
  c) continuing in this manner until the correct alternative indicated by the indicia beneath the opaque covering is exposed.

\* \* \* \* \*